United States Patent [19]

Cain et al.

[11] Patent Number: 5,366,752
[45] Date of Patent: Nov. 22, 1994

[54] TRANS-HARDENED FATS WITH GOOD GLOSS

[75] Inventors: Frederick W. Cain, Voorburg; Adrian D. Hughes, Den Haag, both of Netherlands; Josipa Paska, Lisle, Ill.; Nico Zwikstra, Heemstede, Netherlands

[73] Assignee: Van Den Bergh Foods Co., Division of Conopco Inc., Lisle, Ill.

[21] Appl. No.: 56,722

[22] Filed: May 3, 1993

[30] Foreign Application Priority Data

May 8, 1992 [EP] European Pat. Off. ......... 92304164.4

[51] Int. Cl.$^5$ .............................................. A23D 7/00
[52] U.S. Cl. .................................. 426/607; 426/610; 426/660
[58] Field of Search ..................... 426/610, 607, 660

[56] References Cited

U.S. PATENT DOCUMENTS

| | | | |
|---|---|---|---|
| 3,491,677 | 1/1970 | Bracco . | |
| 3,607,305 | 9/1971 | Westenberg | 426/607 |
| 3,949,105 | 4/1976 | Wieske | 426/607 |
| 4,045,588 | 8/1977 | Wieske | 426/607 |
| 4,061,798 | 12/1977 | Kanegae | 426/607 |
| 4,268,538 | 5/1981 | Toole et al. . | |
| 4,410,557 | 10/1983 | Miller | 426/607 |
| 4,610,889 | 9/1986 | Schmidt | 426/607 |
| 5,135,769 | 8/1992 | Itagaki et al. . | |
| 5,147,676 | 9/1992 | Talbot | 426/607 |
| 5,215,779 | 6/1993 | Dake | 426/607 |

OTHER PUBLICATIONS

Swern 1979 Bailey's Industrial Oil and Fat Products John Wiley & Sons New York p. 440.

*Primary Examiner*—Carolyn Paden
*Attorney, Agent, or Firm*—Cushman, Darby & Cushman

[57] ABSTRACT

Gloss-retention of chocolate compositions, in particular of chocolate coatings can be improved by incorporation of an amount of a fat blend, comprising two fat components i.e. A and B, A being a fat with a $C_{18}$ trans-content of 15–70%
B being a ($H_2M + M_2H$)-type fat, wherein
H = saturated fatty acid $\geq C_{16}$
M = saturated fatty acid: $C_8$–$C_{14}$ with a specific carbon number distribution, such that $$\frac{C40 - C46}{C30 - C38} = 1-20$$

the amounts of B in the blend being: 0.2–30 wt % on fat phase.

7 Claims, No Drawings

TRANS-HARDENED FATS WITH GOOD GLOSS

FIELD OF THE INVENTION

The invention is concerned with trans-hardened fats and to their use as chocolate coating compositions to provide improved gloss retention.

DESCRIPTION OF THE RELATED ART

Although trans-hardened fats are applied in confectionery fats, it is known that these fats often lack a good gloss retention. In the past it was proposed to improve the gloss retention of such trans-hardened fats by the addition of an emulsifier, such as sorbitan tristearate, to such fat compositions.

Although the results of the addition of such an emulsifier were reasonable to good, we prefer to avoid the addition of an emulsifier. Therefore, we have sought for replacers of such emulsifiers, which replacers were of the triglyceride-type.

This search has resulted in the finding that the addition of a specific type of triglycerides to fats, high in trans-hardened fats could lead to results that were at least comparable with those of the addition of sorbitan tristearate.

SUMMARY OF THE INVENTION

Therefore, our invention concerns novel fat blends, comprising at least a fat A with a C18-trans content of 15–70 wt %, preferably of 20–60 wt % and another fat B, which fat B is present in an amount of 0.2–30 wt %, preferably of 0.5–15 wt % (on fat phase), which fat B is a vegetable fat of the ($H_2M+HM_2$)-type, wherein H=saturated fatty acid with $\geq C_{16}$, M=saturated fatty acid with $C_8$–$C_{14}$, preferably with $C_{12}$–$C_{14}$ and wherein the carbon number distribution of the fat constituents is such that:

$$\frac{C40-C46}{C30-C38} = 1\text{--}20, \text{ preferably } 1\text{--}10,$$

$C_{40}$–$C_{46}$ meaning the total amount of the constituents with 40, 42, 44 and 46 carbon atoms in the fatty acid substituents of the compounds and $C_{30}$–$C_{38}$ meaning the same but with 30, 32, 34, 36 and 38 C-atoms. Although the use of ($M_2H+MH_2$) fats in chocolate compositions is the subject of our co-pending patent applications EP 91306027.3; GB 9115421; EP 91306026.5 and EP 92200677.0, it is not disclosed therein that those fats can also be used in fat blends high in trans-fats (i.e. fats with a high amount of C18-trans).

DESCRIPTION OF PREFERRED EMBODIMENTS

The hard fat component ($H_2M+HM_2$) can be the same hard stock as disclosed in the above patent applications. Thus interesterified mixtures of vegetable oils high in triglycerides with fatty acid residues with at least 16 C-atoms and triglycerides rich in lauric and/or myristics acid residues can be used advantageously. Very suitable fats are mentioned in our Australian Patent Application 12346/83, S/N 549,465.

Preferred fats are interesterified mixtures of fully hardened palm oil and palm kernel oil, e.g. an interesterified mixture of PO-58 and PK-39. However, also fractions of those hard stocks can be applied, e.g. the fractions as disclosed in above cited EP 92200677.0. These last fractions are characterised by a weight ratio of the $C_{12}/C_{18:0}$ of 0.1–1.2; a content of $C_{36}$–$C_{40}$ triglycerides of less than 25 wt %, whereas the chain length of the fatty acid residues is preferably $C_{12}$–$C_{18}$.

The fat blends, according to the invention, are preferably applied in the coating layer of encapsulated fillings. The product can be in the form of a filled chocolate bar or as a bonbon. The amount of the blend in the coating will be at least 20 wt %, preferably 30–45 wt %.

Another part of the invention is the use of those fat blends in chocolate compositions in order to improve the gloss retention of chocolate-coating compositions.

EXAMPLE

The invention will now be illustrated by the following examples:

Examples

The basic formulation applied had the following composition:

| | |
|---|---|
| sugar | 48 wt % |
| cocoa powder 10/12 | 20 wt % |
| fat | 32 wt % |
| lecithin | 0.4 wt % |

The following fats were applied:

A: midfraction of a hard-soybean/cottonseed oil blend with:
  $C_{16}$:20.0 wt %
  $C_{18}$:6.5 wt %
  $C_{18:1}$cis:20.0 wt %
  $C_{18:1}$trans:50.0 wt %

B: fat A with 5% of a ($M_2H+MH_2$) fat with a ratio $$\frac{C40-C46}{C30-C38} = 8.3$$

C: fat A with 2 wt % sorbitan tristearate.

Example I

Bars were made using the compositions shown above. A gloss rating was given to the samples at regular time-intervals. The table below shows the length of the time the gloss of the bars was considered acceptable.

| storage temp ° C. | fat A | fat B | fat C |
|---|---|---|---|
| | | weeks | |
| 13 | >12 | >12 | >12 |
| 20 | >12 | >12 | >12 |
| 25 | 10 | >12 | >12 |
| 15/25 | 8 | >12 | >12 |

As can be concluded from above the results with the fat blends according to the invention (=fat B) are comparable with the results obtained with fats containing emulsifier (=fat C), but are better than with fats without emulsifier or ($M_2H+MH_2$) fats (=fat A).

Example II

Corks were enrobed using the formulations shown in example I. The samples were given a gloss rating at regular time intervals.

The table below mentions the length of time the enrobed corks were considered to have acceptable gloss.

| storage temp ° C. | fat A | fat B |
|---|---|---|
| | weeks | |
| 13 | >12 | >12 |
| 20 | >12 | >12 |
| 25 | 12 (8w:bloom) | >12 |
| 15/25 | 6 | 12 |

So, the addition of the (M$_2$H+MH$_2$)-fat (=fat B) resulted in a better gloss retention.

Example III

Examples I and II were repeated, however, applying as fat A a hardened soy bean oil blend with:

| | |
|---|---|
| C$_{16}$ | 11.0 wt % |
| C$_{18:0}$ | 9.5 wt % |
| C$_{18:1}$ *cis* | 25.0 wt % |
| C$_{18:1}$ *trans* | 50.0 wt % |

This fat A was blended with 5% of the following examples of fat B, resulting in fats D–G.

Fat D: with 5% of a (M$_2$H+MH$_2$) fat with ratio $$\frac{C_{40}-C_{46}}{C_{30}-C_{38}} = 8.3$$

Fat E: with 5% of a (M$_2$H+MH$_2$) fat with ratio $$\frac{C_{40}-C_{46}}{C_{30}-C_{38}} = 2.8$$

Fat F: with 5% of a (M$_2$H+MH$_2$) mid fraction with ratio $$\frac{C_{40}-C_{46}}{C_{30}-C_{38}} = 7.6$$

Fat G: with 5% of a (M$_2$H+MH$_2$) olein fraction with ratio $$\frac{C_{40}-C_{46}}{C_{30}-C_{38}} = 1.1$$

As comparison a blend of fat A and 5% sorbitan tristearate was applied (=fat H).

The results are mentioned in the tables:

| storage T ° C. | fat A | Gloss retention of bar | | | | |
|---|---|---|---|---|---|---|
| | | D | E | F | G | H |
| | | in weeks | | | | |
| 13 | >12 | >12 | >12 | >12 | >12 | >12 |
| 20 | >12 | >12 | >12 | >12 | >12 | >12 |
| 25 | 4 | >12 | >12 | >12 | >12 | >12 (bloom) |
| 15/25 | 3 | >8 | >8 | >8 | >8 | >8 |

| storage T ° C. | fat A | Gloss retention of coated corks | | | | |
|---|---|---|---|---|---|---|
| | | D | E | F | G | H |
| | | in weeks | | | | |
| 13 | >12 | >12 | >12 | >12 | >12 | >12 |
| 20 | >12 | >12 | >12 | >12 | >12 | >12 |
| 25 | 3 | 10 | 10 | 10 | 10 | 10 |
| 15/25 | 3 | 10 | 10 | >8 | 10 | >10 |

We claim:

1. Fat blend comprising at least a fat A with a C$_{18}$ trans-content of 15–70 wt % and another fat B, characterised by the presence of 0.2–30 wt %, on fat phase of fat B, which fat B is a vegetable fat of the (H$_2$M+HM$_2$) type, wherein
   H=saturated fatty acid ≧C$_{16}$
   M=saturated fatty acid with C$_8$–C$_{14}$ and wherein the carbon number distribution of the fat constituents is such that $$\frac{C40 - C46}{C30 - C38} = 1-20$$

C40–C46 being compounds with a total carbon number distribution of the fatty acid substituents of 40, 42, 44 and 46 carbon atoms and C$_{30}$–C$_{38}$ meaning compounds with 30, 32, 34, 36, and 38 carbon atoms.

2. Fat blend, according to claim 1, wherein the amount of fat B is 0.5–15 wt %.

3. Fat blend according to claim 1, wherein the ratio $$\frac{C40-C46}{C30-C38} = 1-10$$

4. Fat blend according to claim 1, wherein the C$_{18}$ trans content of fat A is 20–60 wt %.

5. Fat blend according to claim 1, wherein M is C$_{12}$–C$_{14}$.

6. Encapsulated chocolate fillings, consisting of at least a filling and a coating, wherein the coating comprises at least 20 wt %, on total coating composition of the fat blend according to claim 1.

7. Method for the improvement of the gloss retention of chocolate coating compositions, comprising a fat with a high C$_{18}$ trans content, wherein the improvement is obtained by using the fat blend according to claim 1.

* * * * *